US012809693B2

(12) United States Patent
Tylik et al.

(10) Patent No.: US 12,809,693 B2
(45) Date of Patent: Nov. 24, 2026

(54) LOCALIZATION FOR ASYNCHRONOUS JOBS

(71) Applicant: Dell Products L.P., Round Rock, TX (US)

(72) Inventors: Dmitry Tylik, Westborough, MA (US); Alan Greenspan, Northborough, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 375 days.

(21) Appl. No.: 18/662,365

(22) Filed: May 13, 2024

(65) Prior Publication Data

US 2025/0348366 A1 Nov. 13, 2025

(51) Int. Cl.
*G06F 9/46* (2006.01)
*G06F 9/52* (2006.01)

(52) U.S. Cl.
CPC .................................... *G06F 9/52* (2013.01)

(58) Field of Classification Search
CPC ........................................................ G06F 9/52
See application file for complete search history.

*Primary Examiner* — Gregory A Kessler
(74) *Attorney, Agent, or Firm* — Amin, Turocy & Watson, LLP

(57) ABSTRACT

Architectures and techniques are described that can provide localization for asynchronous jobs. The content generated by an offer service of a software as a service (SaaS) platform from an asynchronous job can be persisted by a jobs management service. The jobs management service is not the owner of the data, but can provide language localization appropriate for the client locale that is requesting the persisted data. Such can be accomplished by numerous approaches, including an approach that instructs the offer service to transmit localization data at the time of content generation, which can be persisted by the jobs management service.

20 Claims, 11 Drawing Sheets

LOCALIZATION FOR ASYNCHRONOUS JOBS

BACKGROUND

A software as a service (SaaS) platform is a type of cloud computing service that provides software applications over the internet. SaaS platforms typically operate according to a subscription-based model where customers or clients can access software applications without having to install, configure, or maintain the software on their own computers or servers. Rather, clients can gain access to various services via application programming interfaces (APIs). The many services that are available on a conventional SaaS platform, can be categorized as one of synchronous or asynchronous. When an offer service performs a job, the resulting output can be immediately consumed by the client, which is considered a synchronous job. On the other hand, when the resultant output is not immediately consumed by the client, but rather must be persisted for later consumption, such is considered an asynchronous job.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
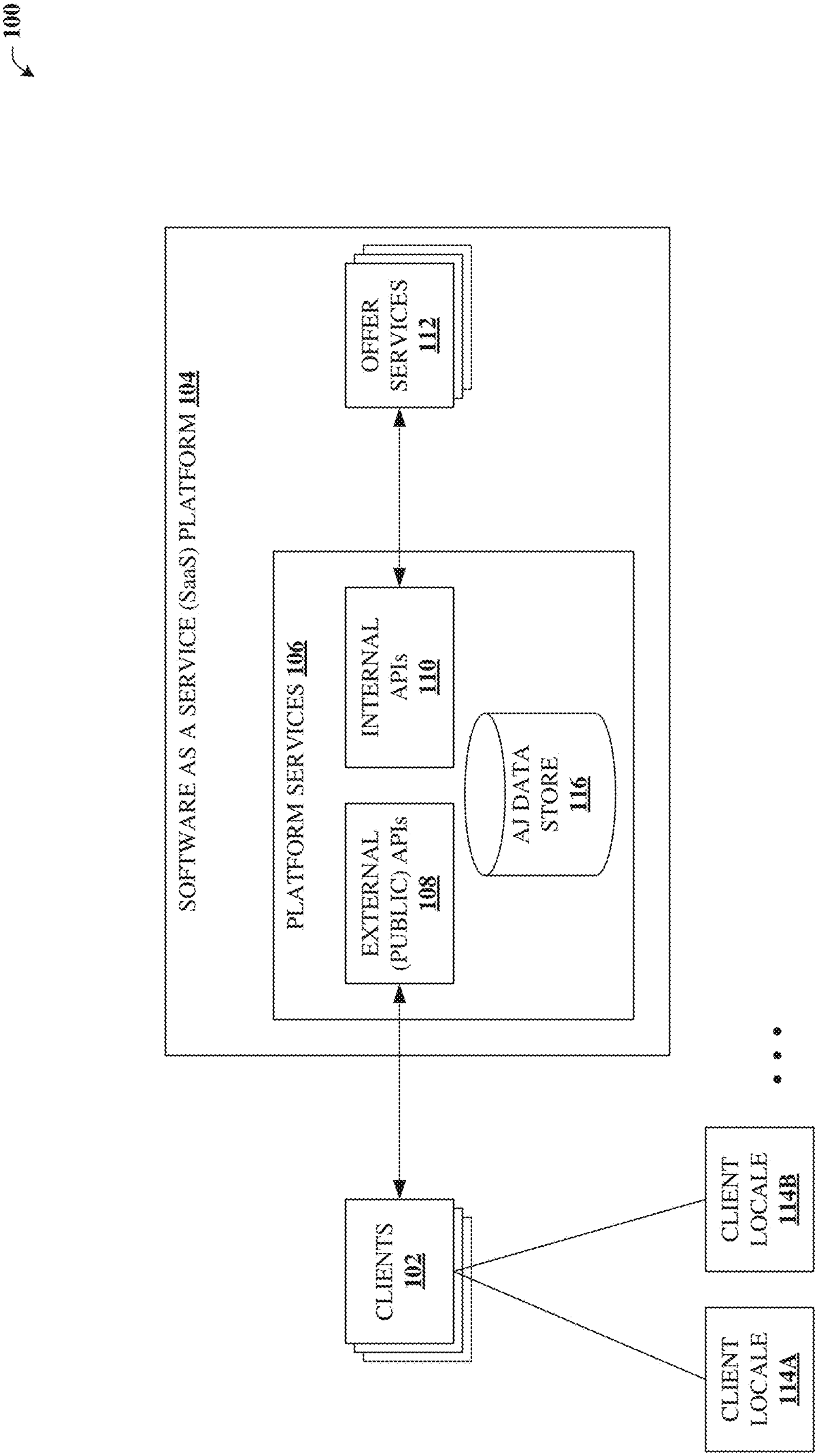
FIG. 1 shows a schematic block diagram illustrating an example software as a service (SaaS) platform in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

To provide additional context, consider FIG. 1. FIG. 1 shows a schematic block diagram 100 illustrating an example software as a service (SaaS) platform 104 in accordance with certain embodiments of this disclosure.

As illustrated, clients 102 of SaaS 104 can interface with SaaS 104 via one or more platform services 106. Platform services 106 can comprise external (e.g., publically accessible by client 102) APIs 108. In addition to public API interfaces that are common, in some embodiments, SaaS 104 can accommodate web-based user interfaces as well. Platform services 106 can further comprise internal APIs 110, the latter of which is not typically accessible by client 102. Rather, the internal APIs 110 can be accessed by offer services 112. In the context of a SaaS (e.g., SaaS 104), an offer service (e.g., offer service 112) can relate to a software application or solution that is provided to clients (e.g., clients 102) over the internet. The offer service is typically delivered on a subscription-based model, where customers pay a recurring fee to access and use the software. The offer service is usually a pre-configured, pre-packaged solution that is designed to meet the specific needs of a particular industry, business function, client, or a client group. Hence, client 102 can send a job request via platform services 106 to access a given offer service 112.

As noted in the background section, jobs performed by SaaS platform 104 can be classified as either synchronous, in which output or data is immediately consumed, or asynchronous in which the output or data is not immediately consumed and therefore must be persisted for later consumption. In the latter case, data or output from a given job can be stored in asynchronous job (AJ) data store 116. AJ data store 116 is illustrated here to be a part of platform services 106, but it is understood that AJ data store 116 may instead be a component of offer services 112 in other embodiments, or be integrated with a different component of SaaS platform 104, but accessible by platform services 106.

Many complex SaaS systems present users detailed and expressive human readable information about events or actions that occur. In the case of an asynchronous job, that information can be persisted for subsequent recall. In some cases, the time between when the information was generated (e.g., by the asynchronous job) and when it is consumed can range from several hours to years.

As illustrated, clients 102 can have various client locales 114. For example, a large customer may have business operations in many parts of the world such as one division or department headquartered at one location (e.g., client local 114A) where one language is used, and another division or department in another location (e.g., client local 114B), where a different language is used.

Thus, a common situation can arise in which an asynchronous job is launched at first locale 114A (e.g., in English language), but is subsequently consumed at some later time at the second locale 114B (e.g., where German language is read and spoken) where, e.g., the job is being monitored, an example of which can be found in connection with elements depicted in FIG. 2.

Figure 2:
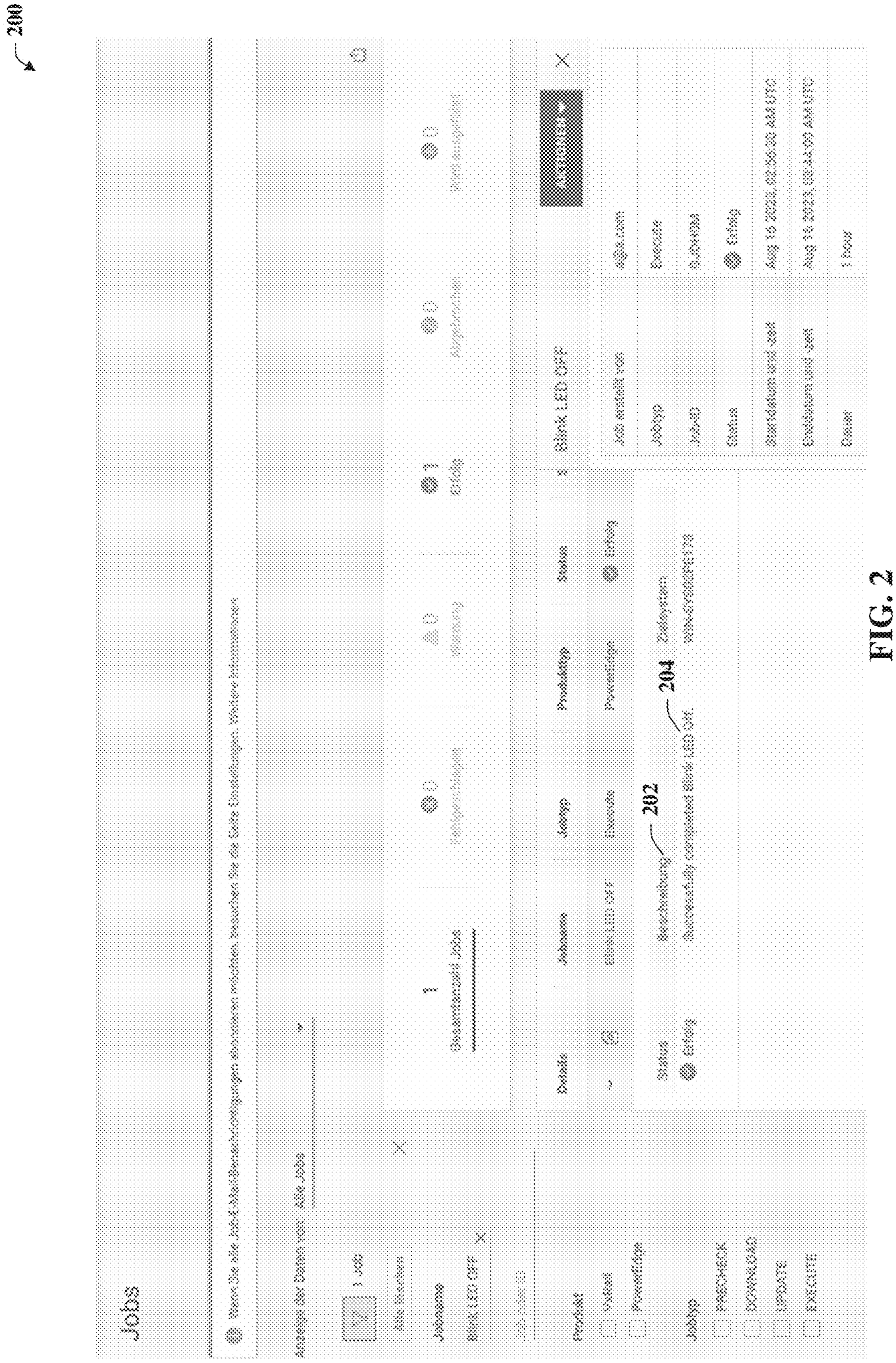
FIG. 2 depicts a graphical depiction illustrating a situation in which a part of a job name is presented in German language and another part is presented in English language in accordance with certain embodiments of this disclosure.

While still referring to FIG. 1, but turning now as well to FIG. 2, graphical depiction 200 is illustrated. Graphical depiction 200 illustrates a situation in which a part of a job name is presented in German language and another part is presented in English language in accordance with certain embodiments of this disclosure. In that regard, element 202 is presented in German, while element 204 is presented in English. It can be appreciated that such can cause issues in locale 114B where data generated by the asynchronous job is presented.

One technical difficulty that arises for detailed and informative messages, is those messages are often picked from a developer-created message catalog interpolating parameters for a specific action or event. In the case of tracking progress of long running operations or asynchronous events notifications, messages are typically persisted by a dedicated component responsible for such tracking or notifications (e.g., a jobs management service, detailed below). Furthermore, at the time of a message generation, all languages in which associated data will need to be presented to users may not be known. Moreover, in most SaaS systems components are built and deployed independently leveraging microservice and polyglot paradigms, so there is minimal coupling. Therefore, leveraging a shared message catalog, like it is done in many applications, is not really a good idea as such can introduce unwanted coupling.

In the example illustrated by graphical depiction 200, a jobs management service (JMS) (e.g., platform services 106) can be responsible for orchestrating long running operations and/or asynchronous jobs for the SaaS platform 104. Thus, the JMS or other platform service 106 can present job status information in a graphical user interface (GUI) when the asynchronous job data is to be subsequently consumed. However, it is noted that the JMS or other platform service 106 is not the owner of the data. Rather, the asynchronous job data can be generated by an offer service 112.

Unlike synchronous jobs, where the data can be immediately presented and/or consumed by the user in the same language (e.g., the job was launched with one language preference selected, and results are immediately presented according to the same language preference), asynchronous jobs can have the above-mentioned issue. Namely, that the job can be invoked (e.g., at locale 114A where English is preferred) by a request to offer service 112, but associated data is subsequently consumed (e.g., at locale 114B where German is preferred) by a request to the JMS or other platform service 106.

As noted, the JMS does not own jobs data (e.g., name, status, . . . ) and is not responsible for the creation of such data. Rather, this data is supplied by offer service 112 and is to be persisted by the JMS for asynchronous retrieval. This data, generated in English cannot simply be translated to German on the fly (e.g., by generative artificial intelligence (AI) and/or a large language model (LLM)) because the results typically must be review-approved and/or undergo many rounds of review in order to verify.

Further compounding the issue of presenting the jobs data in the language associated with the locale (e.g., client locale 114B) of data consumption rather than the language of the locale (e.g., client locate 114A) of data creation is that actual data may not be a simple string, but rather can be created with parameters that reference other information, such as a user-supplied reference to a storage endpoint for data lookup. While a simple string may be more easily translated, it is noted that the parameters (e.g., job name, status, or the like) are not to be translated, as that information indicates where the intended content can be found.

The disclosed subject matter, in some embodiments, can be used to mitigate the above-noted issues and/or to ensure that synchronous job data is presented in a language associated with client local 114 in which said data is consumed regardless of the language associate with a different client local 114 in which said data was generated. The disclosed subject matter can approach this challenge according to any one of three different techniques detailed herein, namely according to a first approach detailed in connection with FIGS. 3-5, a second approach detailed with reference to FIG. 6, or a third approach detailed in connection with FIG. 7. The three different approaches can have different advantages and can thus be implemented accordingly.

Example Systems

Figure 3:
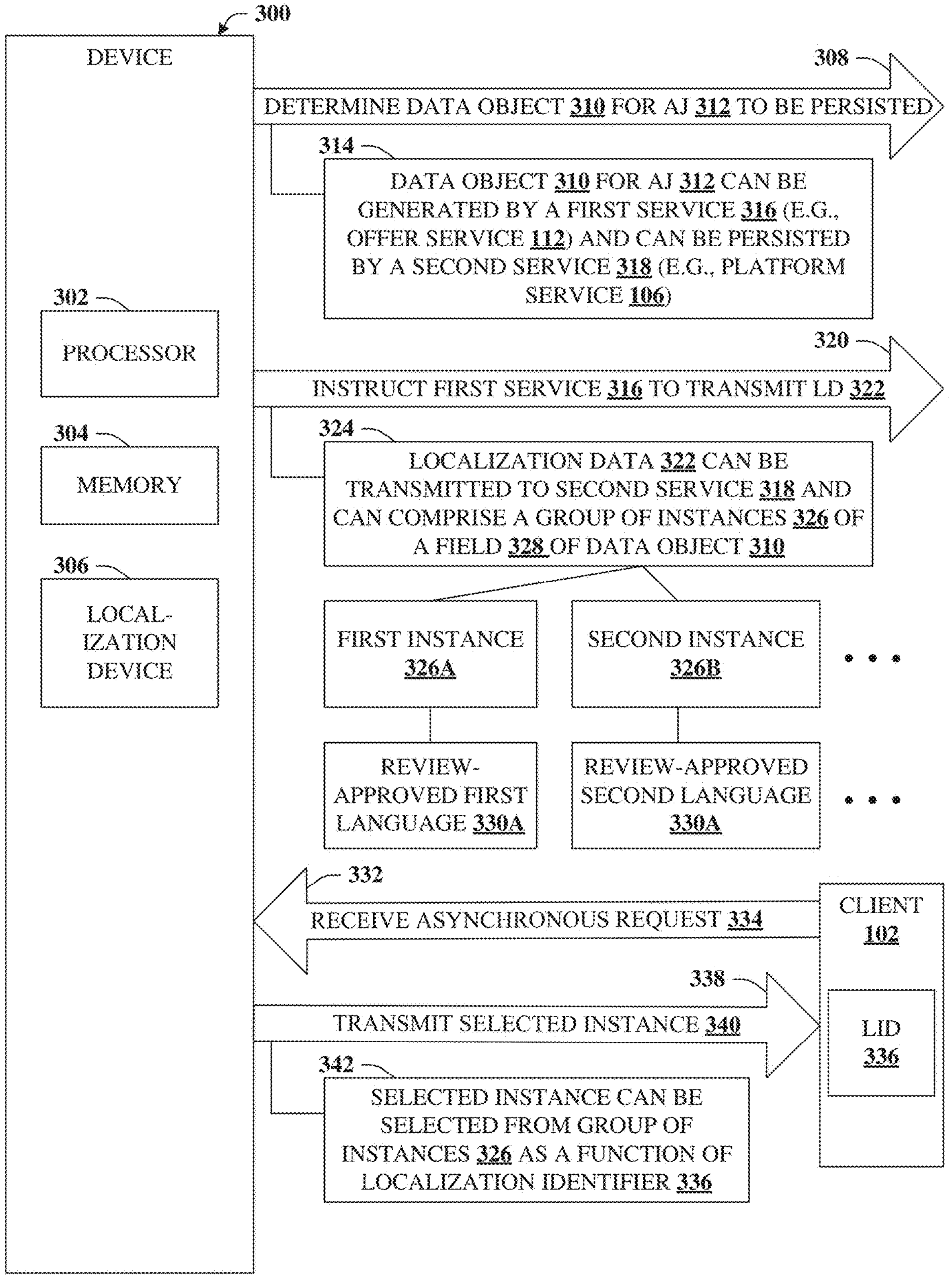
FIG. 3 depicts a schematic block diagram is depicted illustrating an example device that can provide localization for asynchronous jobs, and more specifically can present data objects according to any suitable language in accordance with certain embodiments of this disclosure.

With reference now to FIG. 3, a schematic block diagram is depicted illustrating an example device 300 that can provide localization for asynchronous jobs, and more specifically can present data objects according to any suitable language in accordance with certain embodiments of this disclosure. In some embodiments, device 300 can be communicatively coupled to or integrated with a SaaS platform 104 and/or platform services 106, as detailed in connection with FIG. 1.

Device 300 can comprise at least one processor 302 that, potentially along with localization device 306, can be specifically configured to perform functions associated with localization and particularly in connection with language localization. Device 300 can also comprise at least one memory 304 that stores executable instructions that, when executed by the at least one processor 302, can facilitate performance of operations. Processor(s) 302 can be a hardware processor having structural elements known to exist in connection with processing units or circuits, with various operations of processor 302 being represented by functional elements shown in the drawings herein that can require special-purpose instructions, for example, stored in memory 304 and/or localization device 306. Along with these special-purpose instructions, processor 302 and/or localization device 306 can be a special-purpose device. Further examples of the memory 304 and processor 302 can be found with reference to FIG. 11. It is to be appreciated that device 300 or computer 1102 can represent a server device or a client device of a network or data services platform and computer 1102 can be used in connection with implementing one or more of the systems, devices, or components shown and described in connection with FIG. 3 and other figures disclosed herein.

As illustrated at reference numeral 308, device 300 can determine that data object 310 for asynchronous job 312 is to be persisted. As illustrated at reference numeral 314, such can comprise a determination that data object 310 for asynchronous job 312 is generated by a first service 316 and is to be persisted by second service 318.

In some embodiments, second service 318 can be one or more platform service 106. As a representative example, platform service 106 can be a JMS. As introduced above, as a representative example, a JMS can be responsible for reliably orchestrating long running asynchronous operations created by other components and monitoring those jobs.

In some other embodiments, the JMS can provide for monitoring and managing SaaS applications within an organization's technology portfolio. The JMS can enable reliable discovery of SaaS apps, monitoring of license usage and spending, proactive management of renewals, and tracking of compliance in an automated and scalable manner. JMS can also be responsible for persisting data object 310 for asynchronous job 312 that is generated by a different application or service.

In general, a JMS can provide for SaaS application discovery and inventory management, license usage and spending tracking, renewal and procurement management, compliance and security monitoring, user access and provisioning management, reporting and analytics, and more. A JMS can facilitate numerous benefits such as, e.g., to gain visibility into SaaS applications and usage, to persist data objects 310, and so on.

In some embodiments, first service 316 can be offer service 112, and specifically an offer service 112 that accommodates asynchronous jobs and, hence, produces data objects 310 (e.g., for asynchronous job 312). Representative examples of first service 316 can be found with reference to FIG. 4.

Figure 4:
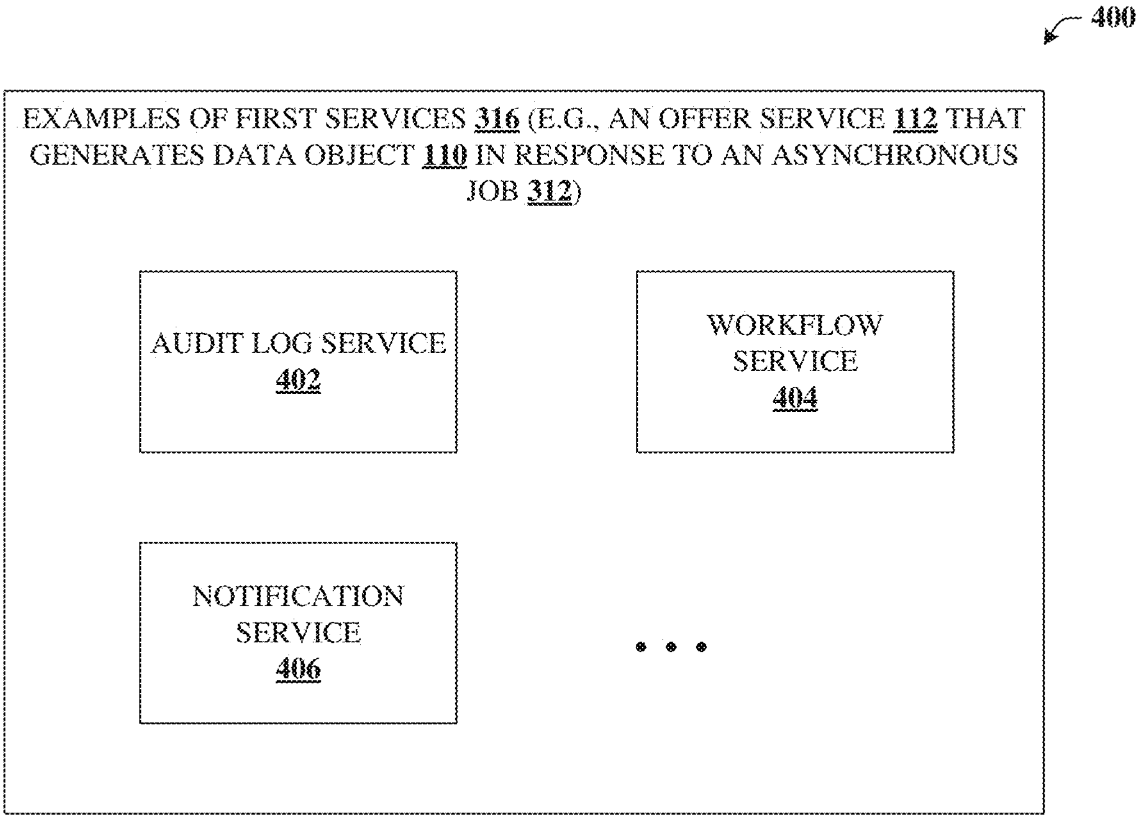
FIG. 4 depicts a schematic block diagram illustrating various examples of the first service in accordance with certain embodiments of this disclosure.

While still referring to FIG. 3, but turning now as well to FIG. 4, a schematic block diagram 400 illustrating various examples of the first service 316 in accordance with certain embodiments of this disclosure.

As one example, first service 316 can be audit log service 402. Audit log service 402 can be a centralized system that records and stores a chronological record of all user activity, events, or changes made within a SaaS platform. Such can include information such as user login attempts, changes to user accounts, access to sensitive data, and other significant events. One purpose of audit log service 402 can be to provide a detailed and tamper-proof record of all activity within the platform, allowing administrators to monitor and track user behavior, identify potential security threats, and ensure compliance with regulatory requirements.

Audit log service 402 can typically capture information such as user account activity, including login attempts, login successes, and login failures; changes to user account settings, including password changes, role changes, and access permissions; access to sensitive data, including files, folders, and applications; system events, including system crashes, errors, and maintenance activities; configuration changes, including changes to system settings, workflows, and integrations; and so forth. Audit logs service 402 can generate data objects 310 for asynchronous job 312.

Another example of first service 316 can be workflow service 404. Workflow service 404 can be a cloud-based solution that enables software vendors to deliver high-performing workflow and process automation tools. These scalable and secure platforms allow companies to offload maintenance, updates, and monitoring from their on-premise, server-based workflow tools to trusted environments. All or a portion of workflows can be monitored and tracked. Workflow service 404 can generate data objects 310 for asynchronous job 312.

Still another example of first service 316 can be notification service 406. Notification service 406 can be a software solution that enables the delivery of timely and targeted messages to users, customers, or subscribers. These messages can be in the form of push notifications, in-app notifications, email notifications, or SMS notifications. One primary goal of a notifications service 406 can be to improve user engagement, increase customer retention, and enhance the overall user experience. As the messages may not be consumed immediately and therefore may need to be persisted, notification service 406 can generate data objects 310 for asynchronous job 312.

Still referring to FIG. 3, at reference numeral 320, device 300 can instruct first service 316 to transmit localization data 322. As indicated at reference numeral 324, localization data 322 can be transmitted to second service 318. Furthermore, localization data 322 can comprise a group of instances 326. Any one of group of instances 326 can comprise a field 328 of data object 310 that is generated in a review-approved language. For example, a first instance 326A can be generated in a review-approved first language 330A and a second instance 326B can be generated in a review-approved second language 330B.

It is to be understood that data of first instance 326A and second instance 326B are in different languages, but the data can be review-approved, rather than merely being an automated and/or dynamically generated translation. Moreover, group of instances 326 can be generated at the time asynchronous job 312 is invoked. Hence, associated data object 310, comprising each one of the group of instances 326 can be persisted by second service 318.

At reference numeral 332, device 300 can receive asynchronous request 334. Asynchronous request 334 can be a request (e.g., from client 102) for data object 310. Asynchronous request 334 can comprise localization identifier 336 that can identifier a client locale 114 associated with client 102 that is consuming data object 310, which may differ from a client locale 114 associated with the job that generated data object 310.

At reference numeral 338, device 300 can transmit selected instance 340 to client 102. As illustrated at reference numeral 342, the selected instance 340 can be one of the group of instances 326 that is selected as a function of localization identifier 336. For example, if localization identifier 336 indicates the language is to be German, then the selected instance 340 can be selected accordingly from among the group of instances 326.

Figure 5:
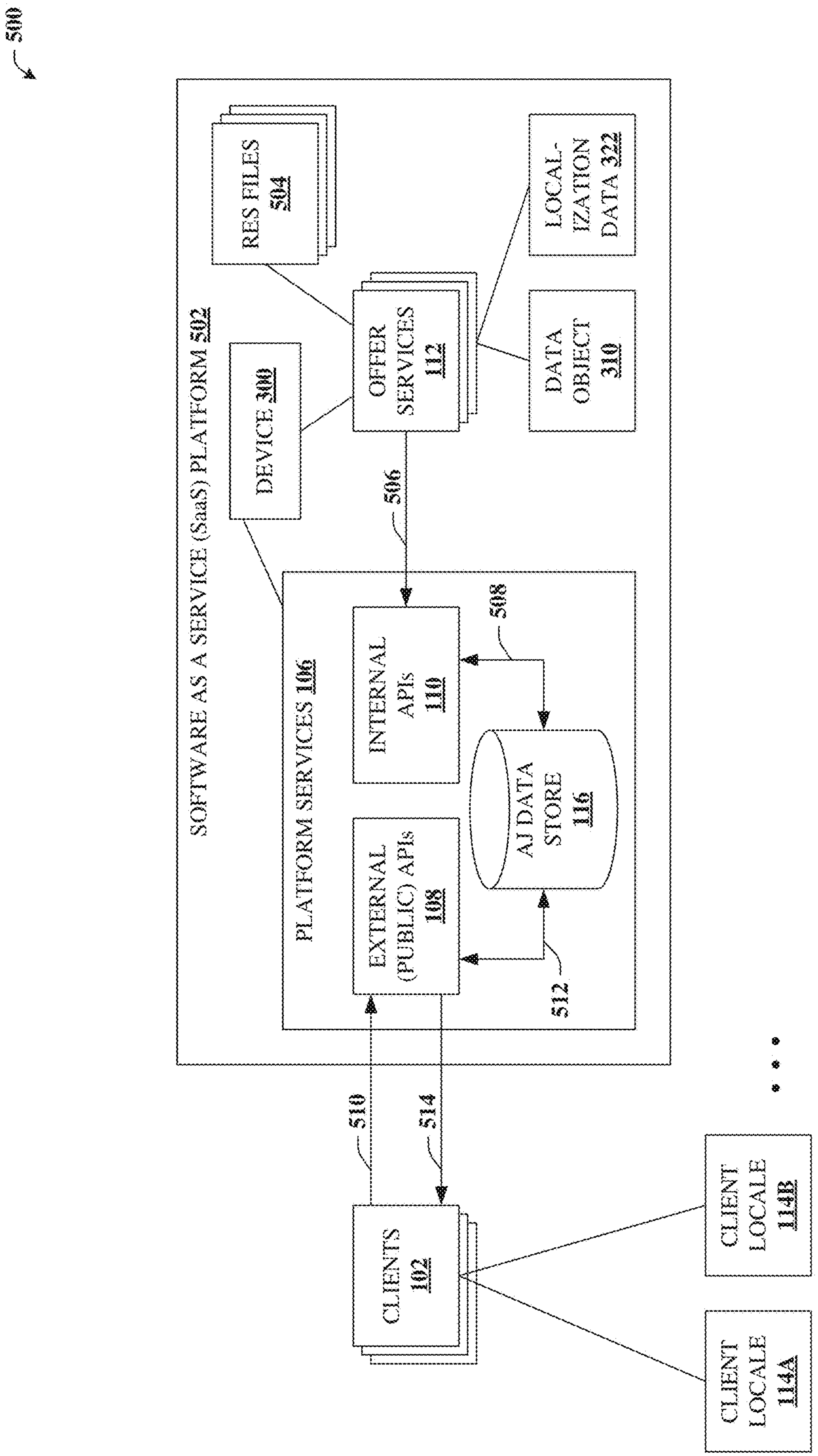
FIG. 5 depicts a schematic block diagram illustrating a first example SaaS platform operating according to a first approach to language localization for asynchronous jobs in accordance with certain embodiments of this disclosure.

With reference now to FIG. 5, a schematic block diagram 500 is depicted illustrating a first example SaaS platform 502 operating according to a first approach to language localization for asynchronous jobs in accordance with certain embodiments of this disclosure.

SaaS platform 502 can be substantially similar to SaaS platform 104. As illustrated, SaaS platform 502 can comprise device 300 as detailed in connection with FIG. 3. For example, all or a portion of device 300 can be included in or operatively coupled to one or more of platform services 106 or offer services 112. In response to a request to perform an asynchronous job 312, an associated offer service 112 can generate data object 310, which can be structured according to a first language. Device 300 can instruct the offer service 112 to generate the group of instances 326 in which a field 328 is generated according to a different language for each one of the group of instances 326. By way of example, field 328 can be a job name field, a job status field, a job type field, a job description field, and so on. It is common that these fields can contain data that is expressive, human-readable, and may include references to other data wherein the reference to other data is not to be translated.

In some embodiments, the group of instances can be generated based on resource files 504. A resource files 504 typically represents a file that contains data or configuration settings that are used by SaaS platform 502 applications to function properly. These files can be used to store various types of information, including information relating to languages and/or translations.

At reference numeral 506, data object 310 (e.g., the data resulting from the asynchronous job 312 that is formatted according to the local language) and localization data 322, which can be combined with data object 310, and can comprise the group of instances 326. To illustrate consider that data object 310 comprises a job name field that in English in the United States or Canada, recites "Deploy Powerflex ABCD buddy!" Multiple different instances of that job name field can be generated at the time of the request via resource files 504. For example, for a different locale associated with Great Britain, the job name field may instead recite "Deploy Powerflex ABCD chap!". For a different locale associated with France, the job name field may instead recite "Provision PowerFlex ABCD mon pote!"

All these various instances 326 can be packaged together and transmitted to platform services 106 (e.g., a JMS), where the data object 310 and associated localization data 322 can be persisted in asynchronous job data store 116, as illustrated at reference numeral 508. Such information can be stored in any suitable manner, but as a representative example, data object 310 and associated localization data 322 can be stored as follows:

```
object {
. . .
JobName localized: {
  [{"locales: ["en", "en-US", en-CA"],
    value: "Deploy Powerflex ABCD buddy!"},
  {"locales: ["en", "en-GB"],
    value: "Deploy Powerflex ABCD chap!"},
  {"locales: ["fr", "fr-FR"],
    value: "Provision PowerFlex ABCD mon pote!"}
  }
. . .
}
```

At reference numeral 510, at a subsequent time, the data generated previously by asynchronous job 312 and persisted in AJ data store 116 can be requested by client 102. This request can include an indication of client locale 114. For example, client locale 114 can be referred to in a header of the request message, a representative example of which is indicated below:

```
Headers:
  Accept-Language: fr-FR
  GET/rest/v1/service/object-id
```

In response, at reference numeral 512, platform service 106 can retrieve the requested data object 310 with the specific instance that matches the client locale 114 information indicated in the header of the request message, namely the payload that indicates "Provision PowerFlex ABCD mon pote!".

As can be observed, in the first approach, JMS clients (e.g., offer services 112) can localize content at the time the content is generated into all known and supported languages and/or locales. The bulk content can then be passed to JMS (e.g., platform service 106) for persistence and tagged with the appropriate locales information. At the time that the external client (e.g., client 102) requests that content in a particular client locale 114, the JMS can assemble the return payload by looking up the associated localized content. One advantage of the first approach is a faster response time, since all data is stored in AJ data store 116 and thus no callbacks to offer service 110 are relied on.

Figure 6:
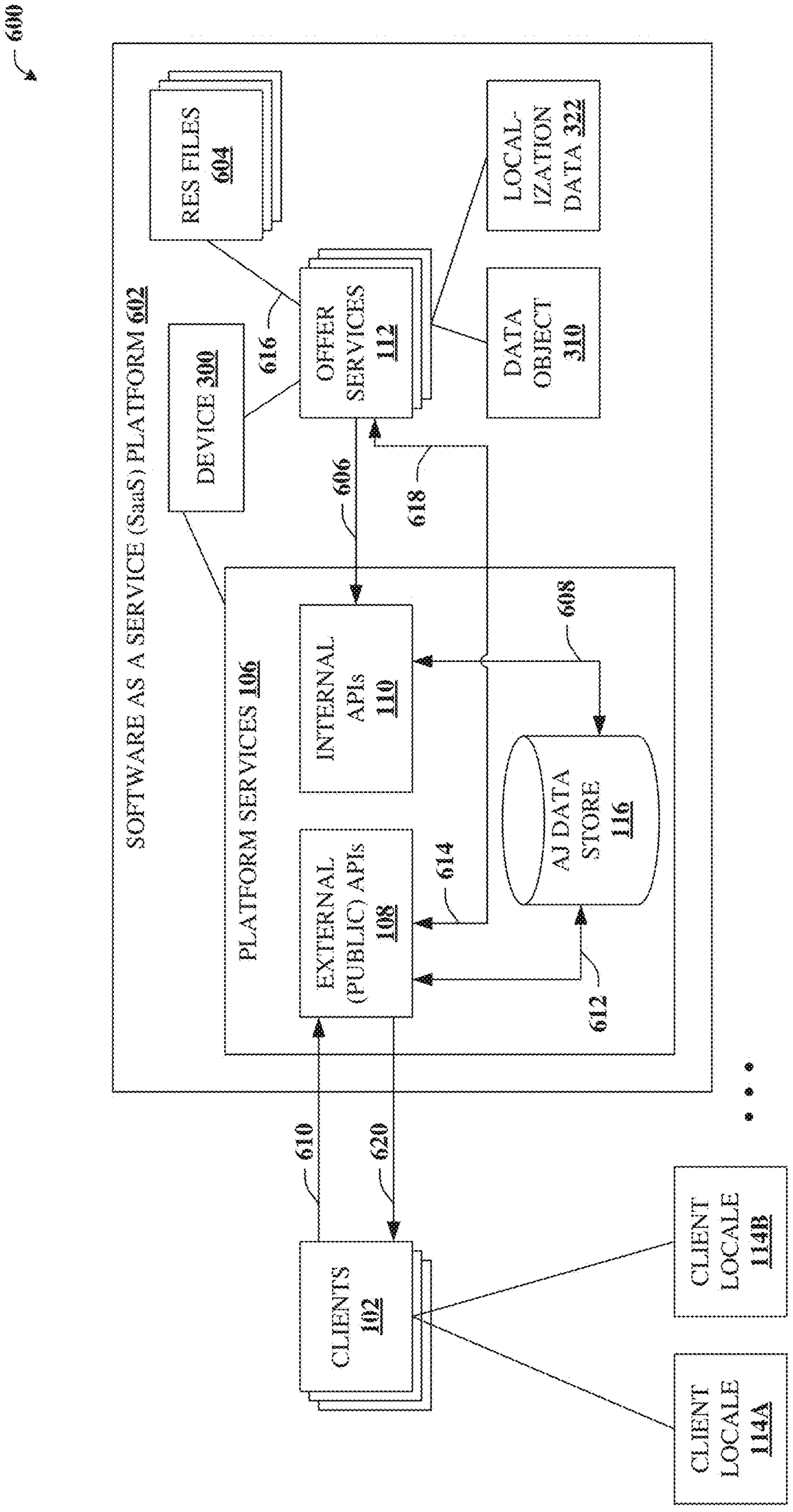
FIG. 6 depicts a schematic block diagram illustrating a second example SaaS platform operating according to a second approach to language localization for asynchronous jobs in accordance with certain embodiments of this disclosure.

Turning now to FIG. 6, a schematic block diagram 600 is depicted illustrating a second example SaaS platform 602 operating according to a second approach to language localization for asynchronous jobs in accordance with certain embodiments of this disclosure.

SaaS platform 602 can be substantially similar to SaaS platform 502. As illustrated, SaaS platform 602 can comprise device 300 as detailed in connection with FIG. 3. For example, all or a portion of device 300 can be included in or operatively coupled to one or more of platform services 106 or offer services 112. In response to a request to perform an asynchronous job 312, an associated offer service 112 can generate data object 310, which can be provided to platform service 106 (e.g., a JMS) as indicated at reference numeral 606.

In the second approach, the JMS clients (e.g., offer service 112) can transmit localizable (but not specifically localized) to the JMS (or other suitable platform service 112). The data object 310 in this case can retain the content in <offer, key, parameter, . . . > form. As a representative example, data object 310 according to the second approach can be structured as follows:

```
object {
. . .
item: {translationURL:
  "cirrus:/rest/v1/translate",
  key: JOB_Name,
  params: ["ABCD"]
. . .
}
```

At reference numeral 608, platform service 106 can store data object 310 to AJ data store 116. At reference numeral 610, at a subsequent time, the data generated previously by asynchronous job 312 and persisted in AJ data store 116 can be requested by client 102. This request can include an indication of client locale 114. For example, client locale 114 can be referred to in a header of the request message, a representative example of which is indicated below:

```
Headers:
  Accept-Language: fr-FR
  GET/rest/v1/jobs/[jobld}
```

In response, at reference numeral 612, platform service 106 can retrieve the requested data object 310 and be apprised of the associated client locale 114. At reference numeral 614, platform service 106 can perform a callback to offer service 112 in order to translate the output to the appropriate client locale 114. To do this, offer service 112 can perform a lookup within resource files 604, as indicated at reference numeral 616.

At reference numeral 618, the offer service can transmit the looked-up payload to platform service 106, which can forward that data to client 102, as indicated at reference numeral 620. One advantage of the second approach is that because callbacks are relied on to retrieve the review-approved translation at the time of consumption, data object 310 stored in AJ data store 116 can be small in size and require less storage space.

Figure 7:
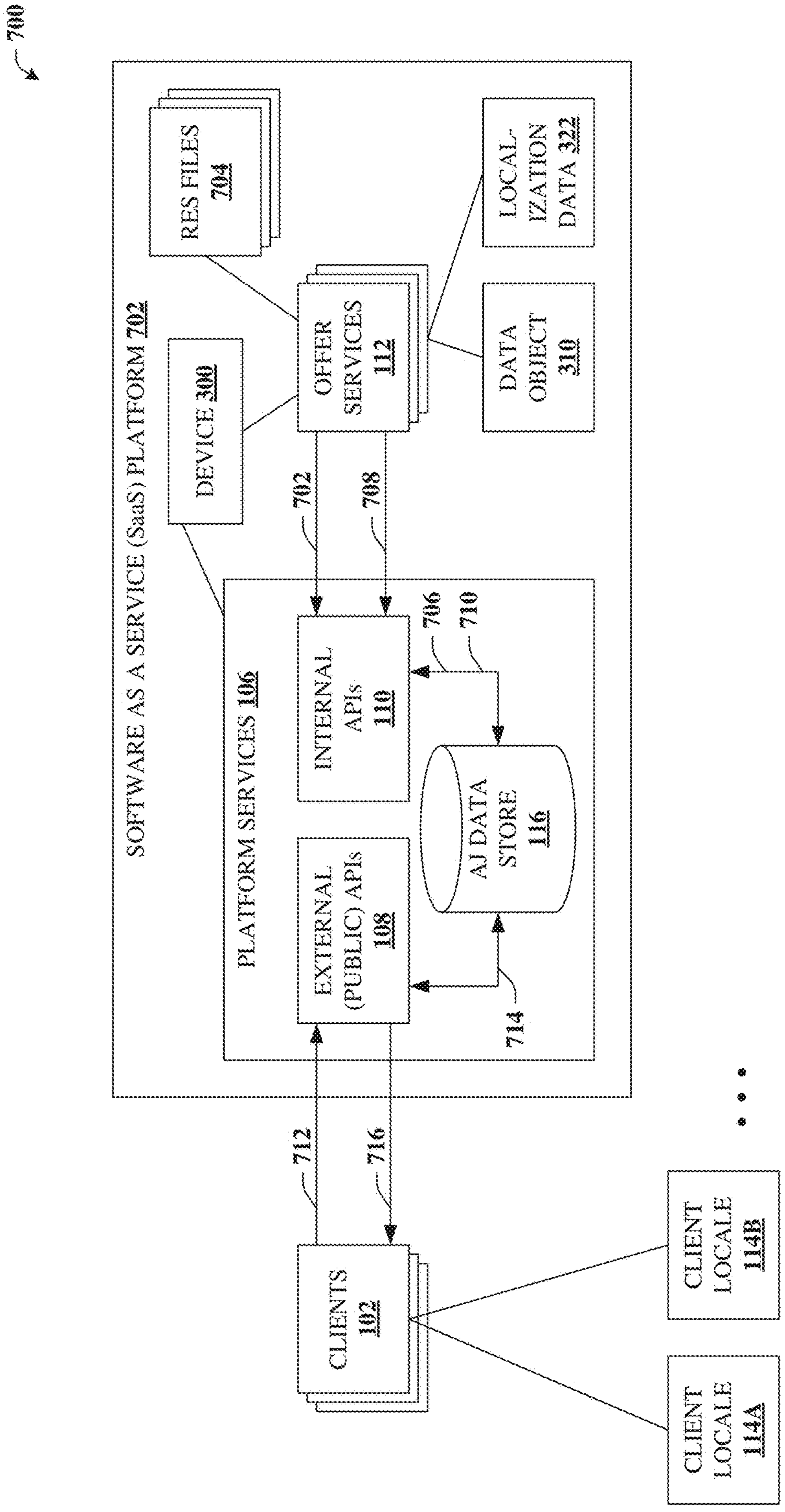
FIG. 7 depicts a schematic block diagram illustrating a third example SaaS platform operating according to a third approach to language localization for asynchronous jobs in accordance with certain embodiments of this disclosure.

Turning now to FIG. 7, a schematic block diagram 700 is depicted illustrating a third example SaaS platform 702 operating according to a third approach to language localization for asynchronous jobs in accordance with certain embodiments of this disclosure.

SaaS platform 702 can be substantially similar to SaaS platforms 502 or 602. As illustrated, SaaS platform 702 can comprise device 300 as detailed in connection with FIG. 3.

For example, all or a portion of device 300 can be included in or operatively coupled to one or more of platform services 106 or offer services 112. In response to a request to perform an asynchronous job 312, an associated offer service 112 can generate data object 310, which can be provided to platform service 106 (e.g., a JMS) as indicated at reference numeral 606.

In the third approach, at some initial time (e.g., on startup or another suitable time), JMS clients and/or internal API 110 clients (e.g., offer service 112) can transfer a message catalog and/or all resource files 704 to platform service 106, as indicated at reference numeral 702. The message catalog can comprise information relating to all supported languages and can retain content in <key, message> form.

At reference numeral 706, platform service 106 can store the message catalog to AJ data store 116. As a representative example, the message catalog can be formatted according to the following structure:

```
catalog {
. . .
JOB_NAME: {
  [{"locales: ["en", "en-US", en-CA"],
    value: "Deploy Powerflex (name) buddy!"},
  {"locales: ["en", "en-GB"],
    value: "Deploy Powerflex (name) chap!"},
  {"locales: ["fr", "fr-FR"],
    value: "Provision PowerFlex (name) mon pote!"}
```

When the asynchronous job is requested and data object 310 is generated, such can be provided to platform service 106, as indicated at reference numeral 708. At reference numeral 710, platform service 106 (e.g., JMS) can store data object 310 to AJ data store 116. It is understood that data object 310 in this case can be localizable, but not necessarily localized and can retain the content in <key, parameter> form. As a representative example, data object 310 can be structured according to the following in the third approach:

```
object {
  key: JOB_NAME,
  params: [name="ABCD"]
}
```

At reference numeral 712, at a subsequent time, the data generated previously by asynchronous job 312 and persisted in AJ data store 116 can be requested by client 102. This request can include an indication of client locale 114. For example, client locale 114 can be referred to in a header of the request message, a representative example of which is indicated below:

```
Headers:
  Accept-Language: fr-FR
  GET/rest/v1/service/object-id
```

In response, as indicated at reference numeral 714, platform service 106 can retrieve the data object 310 from AJ data store 116 and perform localization without callbacks or communicating with other services. Rather, the appropriate content can be assembled into the payload at transmitted to client 102 as indicated at reference numeral 716.

Example Methods

Figure 8:
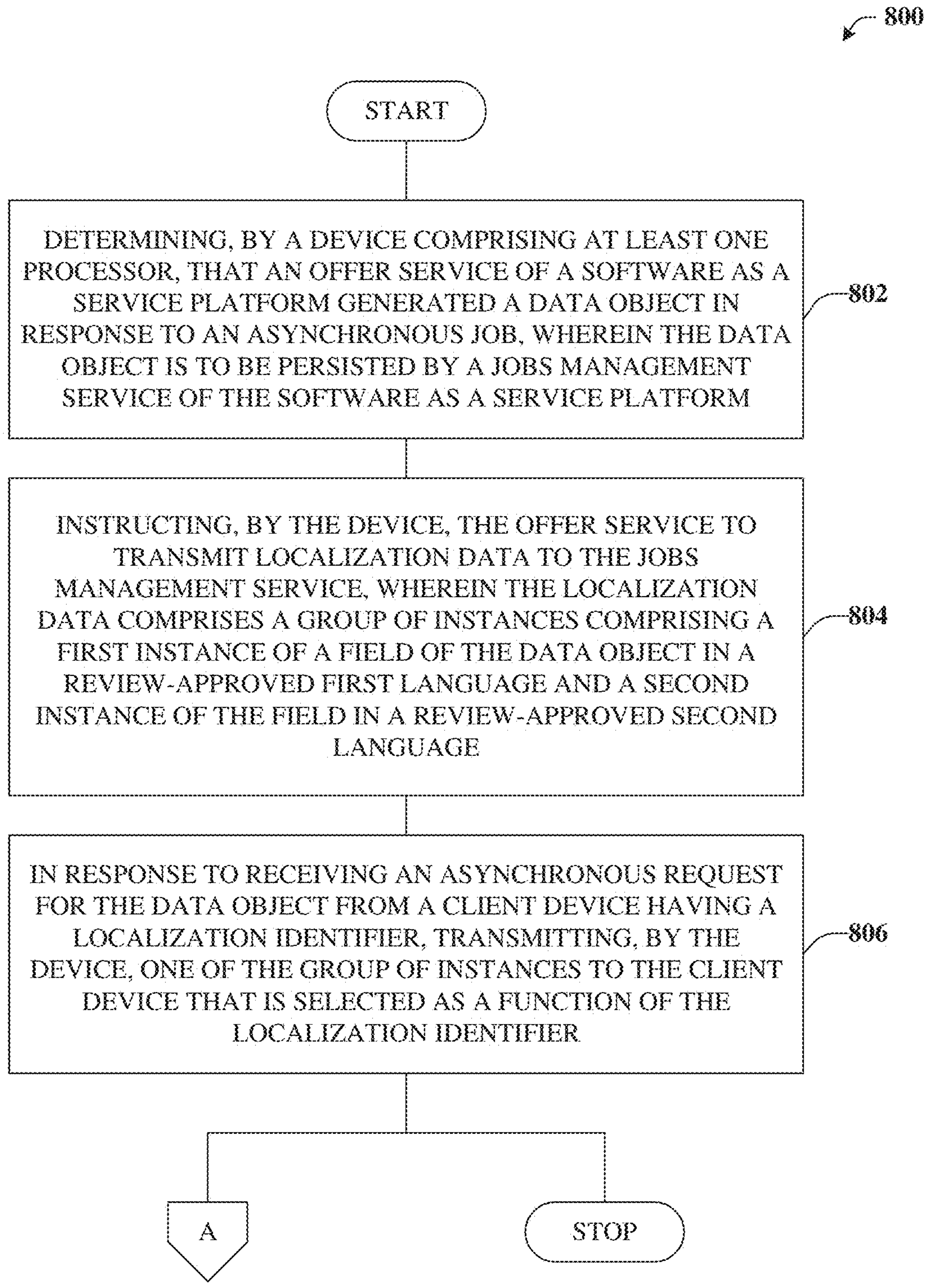
FIG. 8 illustrates an example method that can provide localization for languages in connection with asynchronous jobs in accordance with certain embodiments of this disclosure.
Figure 9:
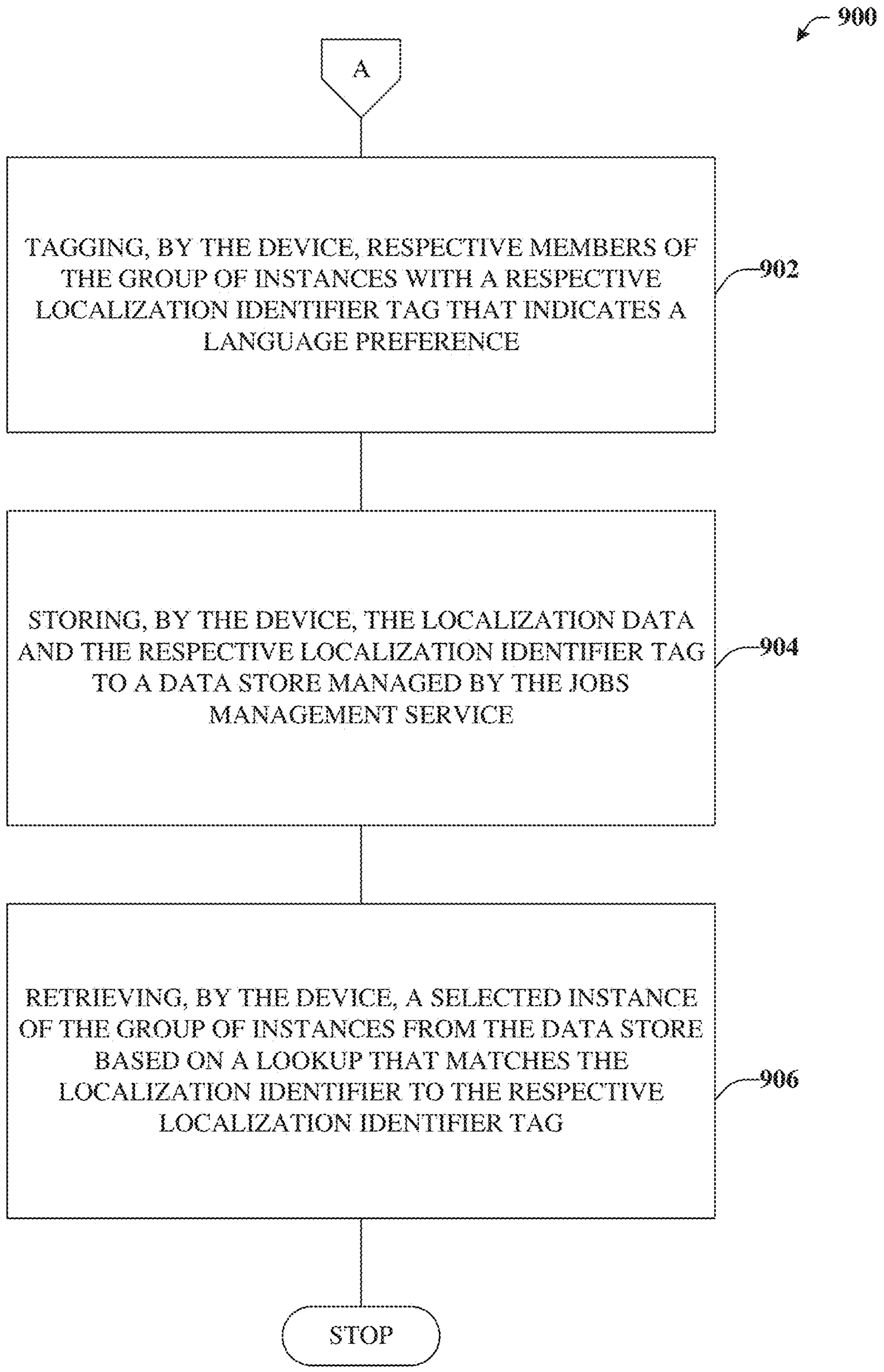
FIG. 9 illustrates an example method that can provide for additional elements or functionality relating to localization for languages in connection with asynchronous jobs in accordance with certain embodiments of this disclosure.

FIGS. 8 and 9 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Turning now to FIG. 8, exemplary method 800 is depicted. Method 800 can provide localization for languages in connection with asynchronous jobs in accordance with certain embodiments of this disclosure. While method 800 describes a complete method, in some embodiments, method 800 can include one or more elements of method 900, reached via insert A, as discussed at FIG. 9.

At reference numeral 802, a device comprising at least one processor can determine that an offer service of a software as a service platform generated a data object in response to an asynchronous job. Because the job is asynchronous, the data object can be persisted by a jobs management service of the software as a service platform.

At reference numeral 804, the device can instruct the offer service to transmit localization data to the jobs management service. The localization data can comprise a group of instances. The group of instances can comprise a first instance of a field of the data object in a review-approved first language and a second instance of the field in a review-approved second language.

At reference numeral 806, in response to receiving an asynchronous request for the data object from a client device having a localization identifier, the device can transmit one of the group of instances to the client device that is selected as a function of the localization identifier. For example, the localization identifier can be received as part of a header of the asynchronous request. Method 800 can terminate in some embodiments, or proceed to insert A in other embodiments, which are further detailed in connection with FIG. 9.

Turning now to FIG. 9, exemplary method 900 is depicted. Method 900 can provide for additional elements or functionality relating to localization for languages in connection with asynchronous jobs in accordance with certain embodiments of this disclosure.

For example, at reference numeral 902, the device introduced in connection with FIG. 8 can, tag respective members of the group of instances with a respective localization identifier tag that indicates a language preference.

A reference numeral 904, the device can store the localization data and the respective localization identifier tag to a data store managed by the jobs management service.

At reference numeral 906, the device can retrieve a selected instance of the group of instances from the data store based on a lookup that matches the localization identifier to the respective localization identifier tag.

Example Operating Environments

Figure 10:
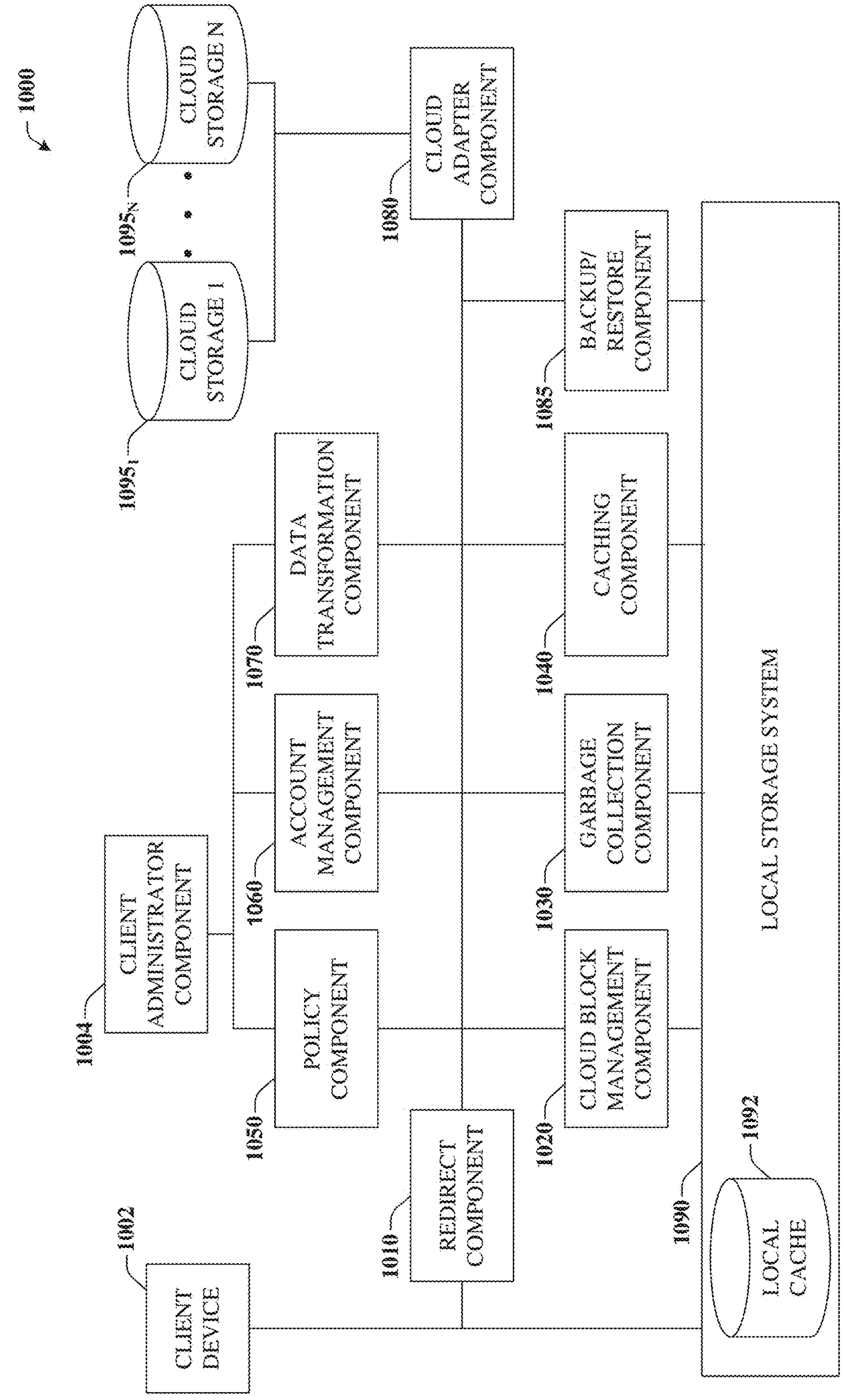
FIG. 10 illustrates a block diagram of an example distributed file storage system that employs tiered cloud storage in accordance with certain embodiments of this disclosure.
Figure 11:
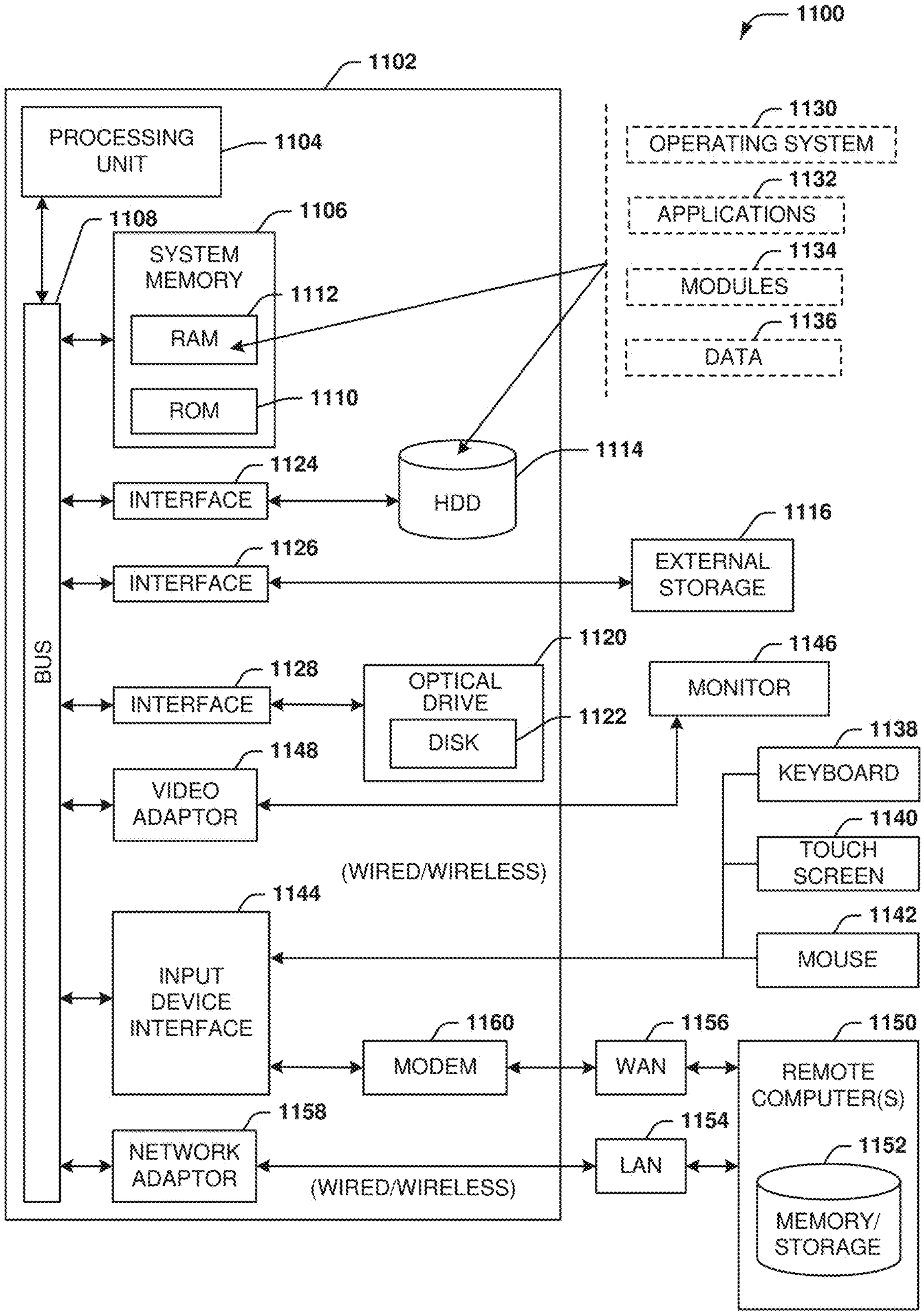
FIG. 11 illustrates an example block diagram of a computer operable to execute certain embodiments of this disclosure.

To provide further context for various example embodiments of the subject specification, FIGS. 10 and 11 illustrate, respectively, a block diagram of an example distributed file storage system 1000 that employs tiered cloud storage and block diagram of a computer 1102 operable to execute the disclosed storage architecture in accordance with example embodiments described herein.

Referring now to FIG. 10, there is illustrated an example local storage system including cloud tiering components and a cloud storage location in accordance with implementations of this disclosure. Client device 1002 can access local storage system 1090. Local storage system 1090 can be a node and cluster storage system such as an EMC Isilon Cluster that operates under OneFS operating system. Local storage system 1090 can also store the local cache 1092 for access by other components. It can be appreciated that the systems and methods described herein can run in tandem with other local storage systems as well.

As more fully described below with respect to redirect component 1010, redirect component 1010 can intercept operations directed to stub files. Cloud block management component 1020, garbage collection component 1030, and caching component 1040 may also be in communication with local storage system 1090 directly as depicted in FIG. 10 or through redirect component 1010. A client administrator component 1004 may use an interface to access the policy component 1050 and the account management component 1060 for operations as more fully described below with respect to these components. Data transformation component 1070 can operate to provide encryption and compression to files tiered to cloud storage. Cloud adapter component 1080 can be in communication with cloud storage 1 $1095_1$ and cloud storage N $1095_N$, where N is a positive integer. It can be appreciated that multiple cloud storage locations can be used for storage including multiple accounts within a single cloud storage location as more fully described in implementations of this disclosure. Further, a backup/restore component 1085 can be utilized to back up the files stored within the local storage system 1090.

Cloud block management component 1020 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1020 in chunks of data. A uniform chunk size can be selected where all files that are tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1060 manages the information for cloud storage accounts. Account information can be populated manually via a user interface provided to a user or administrator of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1020 based on a list of mappings that the cloud block management component 1020 manages. For example, each stub can be associated with an account, and the cloud block management component 1020 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 1080 manages the sending and receiving of data to and from the cloud service providers. The cloud adapter component 1080 can utilize a set of APIs. For example, each cloud service provider may have provider specific API to interact with the provider.

A policy component 1050 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1030. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1030 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 1040 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1020, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1040 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 1040 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that the file has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time the stub file is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 1070 can encrypt and/or compress data that is tiered to cloud storage. In relation to encryption, it can be appreciated that when data is stored in off-premises cloud storage and/or public cloud storage, users can request or require data encryption to ensure data is not disclosed to an illegitimate third party. In one implementation, data can be encrypted locally before storing/writing the data to cloud storage.

In one implementation, the backup/restore component 1085 can transfer a copy of the files within the local storage system 1090 to another cluster (e.g., target cluster). Further, the backup/restore component 1085 can manage synchronization between the local storage system 1090 and the other cluster, such that, the other cluster is timely updated with new and/or modified content within the local storage system 1090.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various example embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an example embodiment, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more example embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:

at least one processor; and at least one memory that stores executable instructions that, when executed by the processor, facilitate performance of operations, comprising:

instructing a first service of a software as a service platform to generate, at a time at which an asynchronous job is invoked, a group of instances comprising a first instance of a field of a data object in a review-approved first language and a second instance of the field in a review-approved second language;

determining that the first service generated the data object in response to the asynchronous job being performed, wherein the data object is to be persisted by a second service of the software as a service platform;

instructing the first service to transmit localization data comprising the group of instances to the second service; and in response to receiving an asynchronous request for the data object from a client device having a localization identifier, transmitting, by the second service from a data store managed by the second service, one of the group of instances to the client device that is selected as a function of the localization identifier, without the second service obtaining the one of the group of instances from the first service in response to the asynchronous request.

2. The device of claim 1, wherein the second service is a jobs management service that is configured to monitor or manage a group of applications or services provided by the software as a service platform.

3. The device of claim 1, wherein the first service is an audit log service that is configured to store a chronological record of activity, events, or changes within the software as a service platform.

4. The device of claim 1, wherein the first service is a workflow service that records aspects of jobs or workflows performed by a group of applications or services provided by the software as a service platform.

5. The device of claim 1, wherein the first service is a notification service that transmits a notification to a user entity of the software as a service platform.

6. The device of claim 1, wherein the first service generates the group of instances based on associated resource files.

7. The device of claim 1, wherein the field is at least one of a job name, a job status, a job type, or a job description.

8. The device of claim 1, wherein the data object comprises a reference to a parameter having a variable value that was determined concurrently with the asynchronous job.

9. The device of claim 1, wherein the operations further comprise tagging respective members of the group of instances with an associated localization identifier that indicates a language preference for a locale associated with the associated localization identifier.

10. The device of claim 1, wherein the operations further comprise storing the localization data to a data store managed by the second service.

11. A non-transitory computer-readable medium comprising instructions that, in response to execution, cause a system comprising at least one processor to perform operations, comprising:

instructing a first service of a software as a service platform to generate, at a time at which an asynchronous job is invoked, a group of instances comprising a first instance of a field of a data object in a review-approved first language and a second instance of the field in a review-approved second language;

determining that the first service generated the data object in response to the asynchronous job being performed, wherein the data object is to be persisted by a second service of the software as a service platform;

instructing the first service to transmit localization data comprising the group of instances to the second service; and in response to receiving an asynchronous request for the data object from a client device having a localization identifier, transmitting, by the second service from a data store managed by the second service, one of the group of instances to the client device that is selected as a function of the localization identifier, without the second service obtaining the one of the group of instances from the first service in response to the asynchronous request.

12. The non-transitory computer-readable medium of claim 11, wherein the second service is a jobs management service that is configured to monitor or manage a group of applications or services provided by the software as a service platform.

13. The non-transitory computer-readable medium of claim 11, wherein the first service is at least one of: an audit log service that is configured to store a chronological record of activity, events, or changes within the software as a service platform, a workflow service that records aspects of jobs or workflows performed by a group of applications or services provided by the software as a service platform, or a notification service that transmits a notification to a user entity of the software as a service platform.

14. The non-transitory computer-readable medium of claim 11, wherein the field is at least one of a job name, a job status, a job type, or a job description.

15. The non-transitory computer-readable medium of claim 11, wherein the data object comprises a reference to a parameter having a variable value that was determined concurrently with the asynchronous job.

16. The non-transitory computer-readable medium of claim 11, wherein the operations further comprise tagging respective members of the group of instances with an associated localization identifier that indicates a language preference for a locale associated with the associated localization identifier.

17. A method, comprising:

instructing, by a device comprising at least one processor, an offer service of a software as a service platform to generate, at a time at which an asynchronous job is invoked, a group of instances comprising a first instance of a field of a data object in a review-approved first language and a second instance of the field in a review-approved second language;

determining, by the device, that the offer service generated the data object in response to the asynchronous job being performed, wherein the data object is to be persisted by a jobs management service of the software as a service platform;

instructing, by the device, the offer service to transmit localization data comprising the group of instances to the jobs management service; and in response to receiving an asynchronous request for the data object from a client device having a localization identifier, transmitting, by the device from a data store managed by the jobs management service, one of the group of instances to the client device that is selected as a function of the localization identifier, without the jobs management service obtaining the one of the group of instances from the offer service in response to the asynchronous request.

18. The method of claim 17, further comprising tagging, by the device, respective members of the group of instances with a respective localization identifier tag that indicates a language preference.

19. The method of claim 18, further comprising storing, by the device, the localization data and the respective localization identifier tag to a data store managed by the jobs management service.

20. The method of claim 19, further comprising retrieving, by the device, a selected instance of the group of instances from the data store based on a lookup that matches the localization identifier to the respective localization identifier tag.

* * * * *